UNITED STATES PATENT OFFICE 2,462,406

SALTS OF ADIPONITRILE SULFONIC ACID

Carl M. Langkammerer, Wilmington, Del., assignor to E. I. du Pont de Nemours & Company, Wilmington, Del., a corporation of Delaware No Drawing. Application June 16, 1948,
Serial No. 33,441

5 Claims. (Cl. 260—465.8)

This invention relates to a new class of organic nitriles. In particular, it relates to certain new nitriles having a sulfonic acid group as a substituent and to their preparation.

Adiponitrile is a highly important industrial chemical, since it is the starting material for the preparation of many compounds, including hexamethylenediamine, a component of one of the principal nylons. Substituted adiponitriles are of considerable scientific and technical interest, per se, or as precursors of a large number of compounds with diverse properties. Unfortunately, few substituted adiponitriles are available for study. In particular, there is no report in the literature of any adiponitrile having sulfo group substituents, in spite of the technical importance that such materials possess.

It is an object of this invention to provide a new class of chemical compounds. A further object is to provide new nitriles having a sulfonic acid group as a substituent. A still further object is to provide adiponitriles having a sulfonic acid group in the beta position. Another object is to provide a convenient method for preparing the new compounds of this invention. Other objects will appear hereinafter.

The objects of this invention are accomplished by providing a new class of products, the metal and ammonium salts of beta-adiponitrilesulfonic acid. These compounds have the general formula

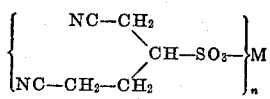

wherein M represents a metal, including the ammonium ion, and $n$ is the valence of the metal.

These new compounds are conveniently prepared by reacting 1,4-dicyano-1-butene with an aqueous solution of an alkali metal bisulfite or ammonium bisulfite. The bisulfite adds to the double bond of the 1,4-dicyano-1-butene so that the sulfo group is attached to the carbon in the beta position relative to the nitrile group. The reaction is represented by the equation:

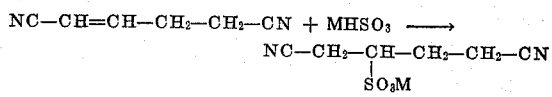

Other metallic salts of beta-adiponitrilesulfonic acid, e. g., the copper, lead or barium salts, may be prepared by reacting an aqueous solution of an alkali metal or ammonium beta-adiponitrilesulfonate with an appropriate water-soluble metal salt such as barium chloride, whereupon the beta-adiponitrilesulfonate of the non-alkali metal forms and may be separated.

The starting material, 1,4-dicyano-1-butene, is conveniently prepared by isomerization of 1,4-dicyano-2-butene, the latter being obtained, for example, by the method described in U. S. Patent 2,342,101 or by the improved methods described in applications Ser. No. 768,283; 768,703 or 768,705. The isomerization of 1,4-dicyano-2-butene to 1,4-dicyano-1-butene may be carried out, according to the method described in application Ser. No. 756,097, filed by Hager on June 20, 1947, now Patent No. 2,451,386, by maintaining 1,4-dicyano-2-butene at elevated temperatures, e. g., between 60 and 150° C., in the presence of a hydrogenating metal such as copper or cobalt, until the 1,4-dicyano-1-butene has formed in substantial amounts. This method gives mixtures of the cis- and trans-isomers, which can be separated by fractional distillation if desired. For the purpose of the present invention either the cis- or the trans-isomers or their mixtures in any proportions can be used.

The reaction between 1,4-dicyano-1-butene and the alkali metal bisulfite is carried out simply by maintaining in intimate contact an aqueous solution of the bisulfite wtih the 1,4-dicyano-1-butene until the addition has proceeded to a substantial extent. The reaction takes place readily at low or ordinary temperature, e. g. between 0 and 30° C., but if desired the reactants may be heated, e. g. up to 100° C. or higher. Any unreacted 1,4-dicyano-1-butene is separated from the aqueous layer, leaving the reaction product in aqueous solution from which it may be isolated by evaporation of the water, preferably under reduced pressure. The crude product may be purified, for example by dissolving it in a solvent such as methanol or ethanol which does not dissolve any unchanged bisulfite which may be present.

The reactants are preferably used in amounts of at least one mole of alkali metal bisulfite or ammonium bisulfite per mole of 1,4-dicyano-1-butene. An excess of the bisulfite, e. g. between 10 and 100%, is often desirable to insure more complete reaction of the 1,4-dicyano-1-butene. The amount of water used is not important. There need to be only enough to dissolve at least part of the bisulfite, although preferably all of it should be dissolved. If desired, the aqueous medium may contain minor or even substantial amounts of an inert organic solvent such as alcohol or dioxane.

There may be used in the process ammonium bisulfite or any alkali metal bisulfite, e. g., lithium, sodium or potassium bisulfite. Thus, there are obtained directly the ammonium, lithium, sodium or potassium salts of beta-adiponitrilesulfonic acid. These salts are the preferred ones since they are obtained directly from the starting ingredients. As already mentioned, other salts such as the copper, calcium, zinc, barium, mercury, aluminum or lead salts may be obtained from these salts by metathetical reactions.

The invention is illustrated in greater detail in the following example, in which parts are by weight.

Example

To a solution of 230 parts of sodium bisulfite in 460 parts of water was added 174 parts of 1,4-dicyano-1-butene (mixture of cis- and trans-isomers) and the reaction mixture was agitated for 5 days at a temperature of 15–20° C. At the end of this time, the upper layer of 27 parts of unreacted 1,4-dicyano-1-butene was removed in a separatory funnel and the aqueous layer was evaporated to dryness under reduced pressure. The solid residue was taken up in 1400 parts of boiling absolute alcohol containing 100 parts of water. The insoluble residue of unreacted sodium bisulfite (96 parts) was removed by filtration. On cooling of the hot alcohol solution there was obtained 232.6 parts of a white crystalline material which was shown by analysis to be the monohydrate of sodium beta-adiponitrile sulfonate, M. P. (sealed tube) 95–97° C. The yield was 73.8% based on the 1,4-dicyano-1-butene actually reacted.

*Analysis.*—Calculated for $C_6H_7O_3N_2SNa \cdot H_2O$: Na, 10.08%. Found, 9.9%.

The water of crystallization was removed by drying in an oven at 105° C. for 2 hours. The anhydrous sodium beta-adiponitrilesulfonate was a white crystalline solid which decomposed without melting when heated.

*Analysis.*—Calculated for $C_6H_7O_3N_2SNa$: Na, 10.95%. Found, 10.8%.

The salts of beta-adiponitrilesulfonic acid are useful per se, for example as fungicides. They are chiefly useful as intermediates in the preparation of other chemicals, for example, esters of beta-sulfoadipic acid which are useful as detergents and plasticizers. Through hydrolysis or hydrogenation of the nitrile groups there are obtained new acids, amides and amines which are useful as polyamide intermediates and in many other applications.

As many apparently widely different embodiments of this invention may be made without departing from the spirit and scope thereof, it is to be understood that this invention is not limited to the specific embodiments thereof except as defined in the appended claims.

I claim:

1. A salt of beta-adiponitrilesulfonic acid selected from the class consisting of the metal and ammonium salts of said acid.
2. A metal salt of beta-adiponitrilesulfonic acid.
3. The ammonium salt of beta-adiponitrilesulfonic acid.
4. An alkali metal salt of beta-adiponitrilesulfonic acid.
5. Sodium beta-adiponitrilesulfonate.

CARL M. LANGKAMMERER.

REFERENCES CITED

The following references are of record in the file of this patent:

UNITED STATES PATENTS

| Number | Name | Date |
| --- | --- | --- |
| 2,312,878 | Carpenter | Mar. 2, 1943 |